Sept. 10, 1963 T. G. MUELLER 3,103,252

AUTOMATIC SCALE FOR PORTIONING POWDERED MATERIAL

Filed April 26, 1960 5 Sheets-Sheet 1

INVENTOR.
Theodore G. Mueller
BY Walt Thomas Jielinski
ATTORNEY.

INVENTOR.
Theodore G. Mueller
BY
Walt Thomas Zielinski
ATTORNEY.

AUTOMATIC SCALE FOR PORTIONING POWDERED MATERIAL

Filed April 26, 1960 5 Sheets-Sheet 3

INVENTOR.
Theodore G. Mueller
BY
Walt Thomas Zielinski
ATTORNEY.

AUTOMATIC SCALE FOR PORTIONING POWDERED MATERIAL

Filed April 26, 1960 5 Sheets-Sheet 4

INVENTOR.
Theodore G. Mueller
BY
[signature]
ATTORNEY.

INVENTOR.
Theodore G. Mueller
BY
ATTORNEY.

United States Patent Office 3,103,252
Patented Sept. 10, 1963

3,103,252
AUTOMATIC SCALE FOR PORTIONING POWDERED MATERIAL

Theodore G. Mueller, Kenmore, N.Y., assignor to Consolidated Packaging Machinery Corporation, Buffalo, N.Y., a corporation of New York Filed Apr. 26, 1960, Ser. No. 24,820
2 Claims. (Cl. 177—107)

This invention relates to the weighing of solid materials, whether in the form of powders, flours, pellets, granules, or larger particles. More particularly, it relates to apparatus for automatically and simultaneously dividing a larger quantity of such materials into aliquot portions and weighing the portions, so that, for instance, the individual portions are then ready to be packaged or bagged or otherwise contained for purposes of storage or transportation and distribution.

Automatic weighing machines or scales are not new by any means. But simplicity and compactness of construction, as opposed to intricacy and massiveness, are and they are incorporated in the apparatus of the present invention, together with sturdiness and speed, accuracy, and reliability of operation. This will readily be seen when it is considered that the basic cooperating units of such apparatus are less than 15 in number and include frame work means within which feed hopper means are mounted and on which fulcrum means for the weighing beam means are suspended; hopper bottom gate means suspended from the opposing hopper sides; gate lock, lock opener, and lock closer means suspended from the framework; counterpoise means connected to, knife-edge means mounted on, and weighing bucket means vertically ordered to lie beneath the hopper bottom and suspended from the weighing beam means; bucket lower end trap door means on which are lock opener actuating means and door fastener means suspended from the opposing lateral surfaces of the bucket means; and, fastener releasing means. Even the preferred embodiment of the apparatus contemplates the further combination therewith of only three more units, i.e., lock arresting means, counterpoise compensating means, and weighing beam equilibrium aiding means.

The automatic scale of the present invention differs from the usual balance scale in that the automatic scale meters an amount of the material to be weighed from the feed hopper into the weighing bucket supported at one end of the weighing beam and the amount metered into the bucket is controlled by a counterpoise, i.e., counterweight, placed at the other end of the weighing beam. More particularly, the amount of flow of the material from the hopper into the bucket is dependent upon the degree to which the hopper bottom is shut by the gate variably or adjustably positioned across it; the positioning of the gate is dependent upon the settings of the gate lock, the lock opener, the lock opener actuating means, the bucket trap door, the trap door fastener, the lock closer, and, in the preferred instrument, the closer arrester; and, these settings are directly or indirectly controlled by the counterpoise, with or without the assistance of the counterpoise compensating means and the weighing beam equilibrium aiding means, and its effect on the positioning of the weighing beam.

For a better understanding of the apparatus of the invention, reference should be had to the attached drawings in which.

Figure 1:
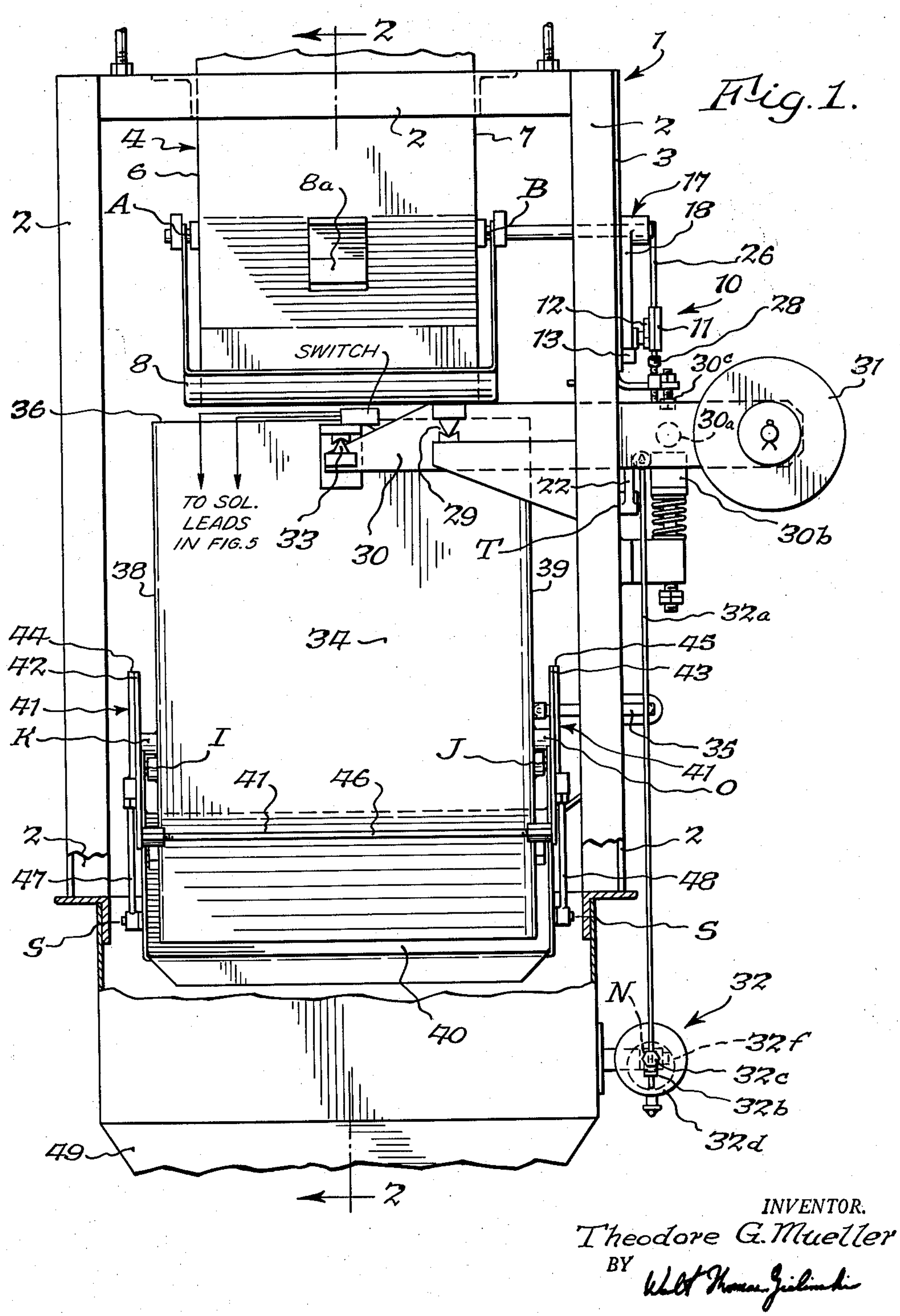
FIGURE 1 is a front view of the automatic weighing machine in the weighing equilibrium position.

FIGURE 1 depicts a preferred embodiment of the automatic weighing machine of the present invention in which framework 1 is made up of angle irons 2 and plate 3, in which hopper 4 is mounted within framework 1, and in which open hopper bottom 5 is not shown. Opposing hopper sides 6 and 7 serve as bases for the suspension for rotation in a vertical plane of hopper bottom gate 8 at pivot points A and B, respectively, and angle iron piece 8*a* on hopper 4 serves as a barrier in the path of gate 8 when it swings to open bottom 5. Portions of gate lock 10, including lock weight 11 and toggle joint second leg 12 and pivot point D from which the latter is suspended, are visible, as is a part of the gate closer 17, i.e., bell crank first arm 18, and as are parts of the closer arrester, i.e., arresting bar 26 and screw 28. Next, fulcrum 29 is mounted on framework 1 and weighing beam 30 is suspended for rotation in a vertical plane from fulcrum 29 and virtually impinges against screw 28 in arresting bar 26 from below, while counterpoise 31 is located on one end of weighing beam 30 and knife-edge 33 is mounted on the other end. A portion of counterpoise compensating means 32 is also shown. Finally, FIGURE 1 shows weighing bucket 34 suspended for as a small degree of rotation in a vertical plane from knife-edge 33 as can be insured by sway link 35 and having open upper end 36, open lower end 37 (not shown), and opposing lateral surfaces 38 and 39. Lower end trap door 40 is suspended for rotation in a vertical plane from surfaces 38 and 39 at pivot points I and J, respectively. Door fastener 41 having fastener toggle joint primary legs 42 and 43, secondary legs 44 and 45 and fastener weight 46 can also be seen, as can rods 47 and 48 connecting each of secondary legs 44 and 45 to the door 40.

Figure 2:
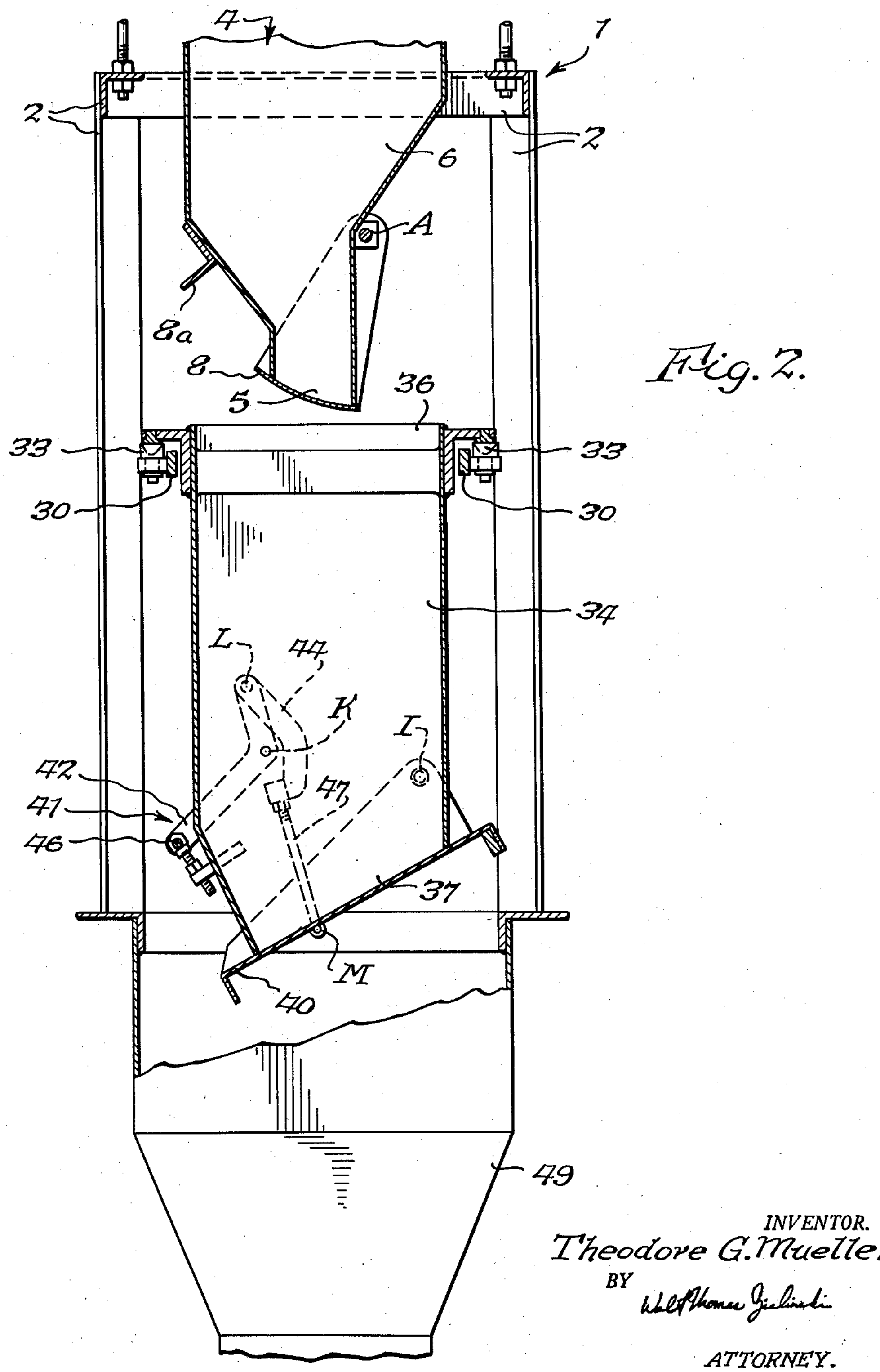
FIGURE 2 is a side section taken along line 2—2 of the automatic weighing machine of FIGURE 1 in the weighing equilibrium position.

FIGURE 2 enables one to see that weighing beam 30 is actually made up of two parallel members joined together by dowel 30*a* (shown dotted in FIGURE 1), so that weighing bucket 34 is carried on two fulcrums 29 and between the two weighing beam 30 members. It also makes clearer the structure of the toggle joints of fastener 41 by showing one end of primary leg 42 connected to fastener weight 46 and the whole leg suspended for rotation in a vertical plane from surface 38 at pivot point K. Secondary leg 44, on the other hand, is suspended at one end for rotation in a vertical plane from the other end of primary leg 42 at pivot point L and suspended at the other end for rotation in a vertical plane from door 40 at point M by means of rod 47.

Figure 3:
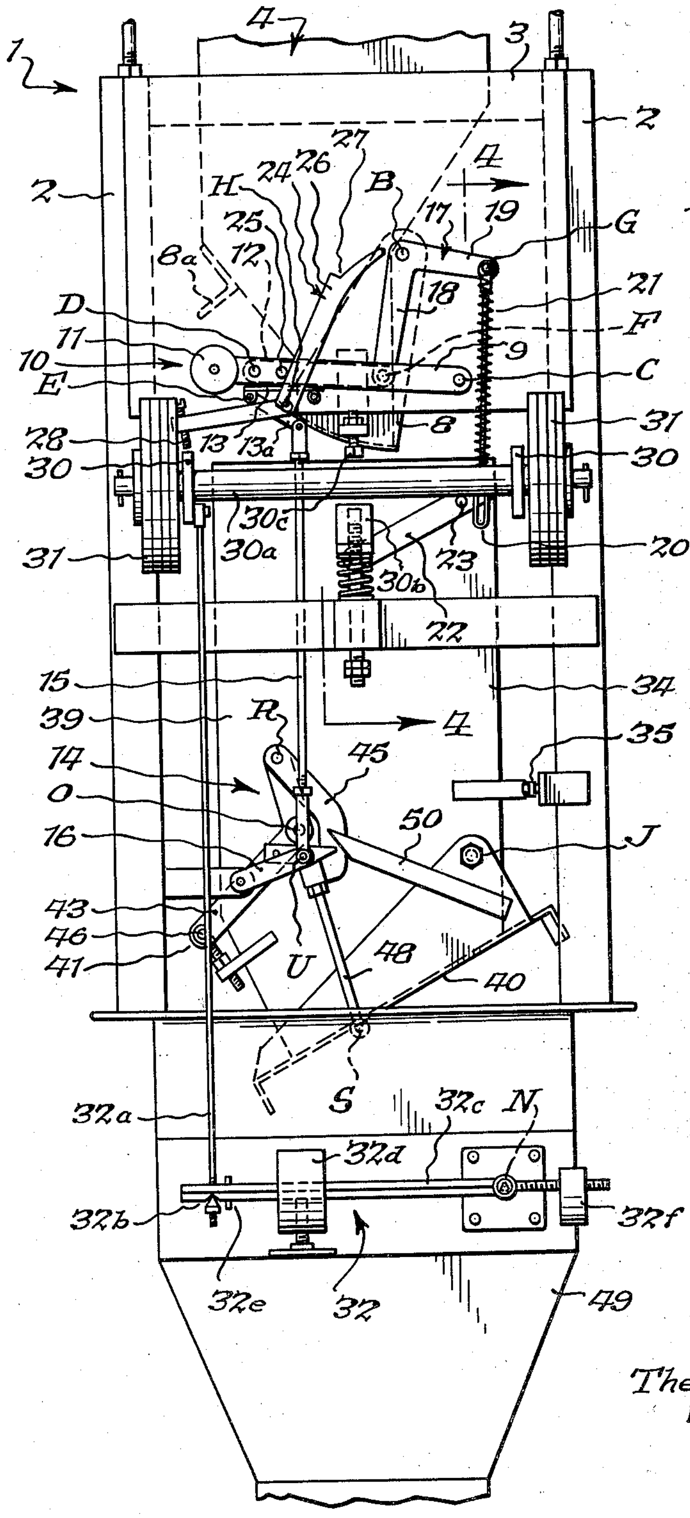
FIGURE 3 is a side view of the automatic weighing machine of FIGURE 1 in the weighing equilibrium position.

FIGURE 3 shows gate 8 and lock toggle joint first leg 9 of gate lock 10 connected at one end to lock weight 11 and suspended at the other end for rotation in a vertical plane from framework plate 3 at pivot point C. Second leg 12 (dotted) is suspended at one end for rotation in a vertical plane from first leg 9 at pivot point D. Also shown is lever 13 of lock opener 14, one end of which impinges against first leg 9 from below and the other end of which is connected by means of piece 13*a* and rod 15 to pawl 16 mounted on framework 1, suspended for rotation in a vertical plane from framework plate 3 at point E. FIGURE 3 then shows lock closer 17 and its bell crank first arm 18 suspended at one end for rotation in a vertical plane from second leg 12 at pivot point F and suspended at the other end for rotation in a vertical plane with gate 8 from pivot point B, albeit by means of an axial extension through framework plate 3. Bell crank second arm 19 connected to first arm 18 and similarly suspended at one end for rotation in a vertical plane at pivot point B suspends, at the other end and for a lesser degree of rotation in a vertical plane, first ends of slotted limit link 20 and spring 21 at pivot point G, while the other ends of link 20 and spring 21 suspend, with the assistance of guide piece 22, sensing pin 23 for a degree of rotation in the vertical plane.

FIGURE 3 next shows closer arrester 24 including stud 25 mounted on first leg 9 inwardly of lock weight 11 and pivot point D and arresting bar 26 having recess 27 along its upper edge on one end and being suspended for rotation in a vertical plane from framework plate 3 at pivot point H. It will also be noted that the other end of arresting bar 26 is brought to close proximity of weighing beam 30 in equilibrium by means of screw 28 projecting downwardly through such bar.

Further, FIGURE 3 depicts weighing beam 30 and dowel 30*a* positioned, with the assistance of counterpoise 31 and counterpoise compensating means 32, to impinge against sensing pin 23 from above. Weighing beam equilibrium aiding means, i.e., compression spring-biased inertia breaker 30*b* and weighing beam dowel brake 30*c*, can also be seen. As shown, compensating means 32 are mounted on a funnel 49 into which bucket 34 can be dumped. The purpose they serve is to compensate for the fact that, because of the inertia of weighing beam 30 and counterpoise 31, the latter cannot be moved toward an equilibrium position or beyond unless an excess amount of the material to be weighed is fed from hopper 4 into bucket 34 and that such an excess will add from 2 to 5% by weight of the material to each desired portion thereof. And the way they effect their compensation is, after some trial and error, by lightening the counterpoise load on weighing beam 30 sufficiently to reduce the 2 to 5% overweight in each weighed portion to about 0.1% by weight. Now, the parts of compensating means 32 include rod 32*a* rotatably connecting them to weighing beam 30, a small knife-edge 32*b* on the end of rod 32*a*, a cross-piece 32*c* resting at one end on knife-edge 32*b* and suspended at the other end for rotation in a vertical plane from funnel 49 at pivot point N, a weight 32*d* slidably mounted on cross-piece 32*c* between stop pin 32*e* and point N, and another weight 32*f* threadably mounted on cross-piece 32*c* outwardly of point N. Such parts work together so that, when bucket 34 is empty and no counterpoise has been placed on weighing beam 30, movement of weight 32*d* toward stop pin 32*e* places the machine generally in balance and movement of weight 32*f* on cross-piece 32*c* effects a fine balance and so that, when bucket 34 is still empty, but counterpoise 31 has been placed on weighing beam 30, movement of weight 32*d* toward pivot point N lightens the counterpoise load on weighing beam 30.

Again, FIGURE 3 shows parts of the means of fastening door 40 on bucket 34 shut and a part of the means by which gate 8 on hopper 4 is opened, i.e., pawl actuating finger 50. The former include fastener toggle joint primary leg 43 connected at one end to fastener weight 46 and suspended for rotation in a vertical plane from surface 39 at pivot point O and secondary leg 45 suspended at one end for rotation in a vertical plane from primary leg 43 at pivot point R and suspended at the other end for rotation in a vertical plane, by means of rod 48, to door 40 at pivot point S.

Figure 4:
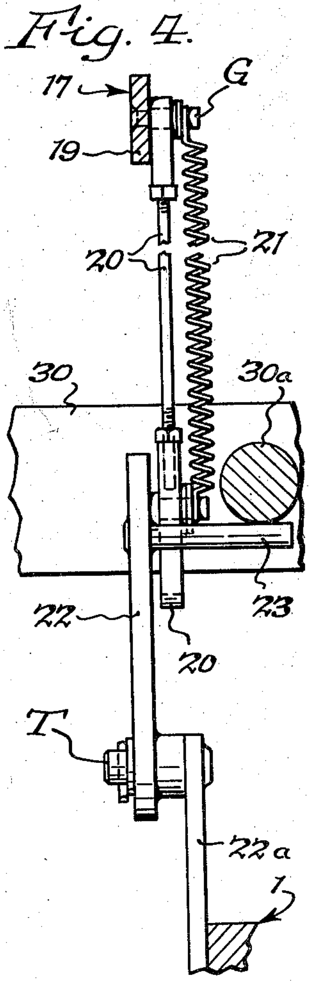
FIGURE 4 is a front section taken along the line 4—4 of the lock closer of the automatic weighing machine of FIGURE 3.

FIGURE 4 shows a close-up of lock closer 17 and, in particular bell crank second arm 19, slotted limit link 20, spring 21, guide piece 22, and sensing pin 23, in its relation to weighing beam 30. Thus, sensing pin 23 impinges against weighing beam dowel 30*a* from below and continues to do so by virtue of the tension in spring 21, while guide piece 22, turning on pivot point T affixed to brace 22*a* on framework 1, acts to minimize any swaying or wandering of sensing pin 23 along dowel 30*a*.

FIGURES 5 to 8 illustrate the operation of the automatic weighing machine of the invention. Thus, in FIGURE 5, hopper 4 is seen to be closed by gate 8, while bucket 34 has its open lower end 37 uncovered so that it can empty. This uncovering is accomplished by the undoing of fastener 41 on trap door 40 which is, in turn, brought about by the employment of the fastener releasing means which are either manual or automatic, e.g., a solenoid, an act in response to the gaining of equilibrium by weighing beam 30 as in FIGURES 1 and 5. What the fastener releasing means do is to raise fastener weight 46, thereby swinging the first ends of fastener toggle joint primary legs 42 and 43 upwardly about pivot points K and O, respectively, and swinging the other ends downwardly, causing secondary legs 44 and 45 to turn about pivot points L and R, respectively, and, with trap door 40, to drop downwardly. This movement of door 40 causes pawl actuating finger 50 thereon to strike downwardly against the end of pawl 16 of gate lock opener 14, but, because such end is rotatable in a clockwise direction about pivot point U on opener connecting rod 15, finger 50 is not obstructed from passing downwardly beyond the pawl 16.

Figures 5, 6:
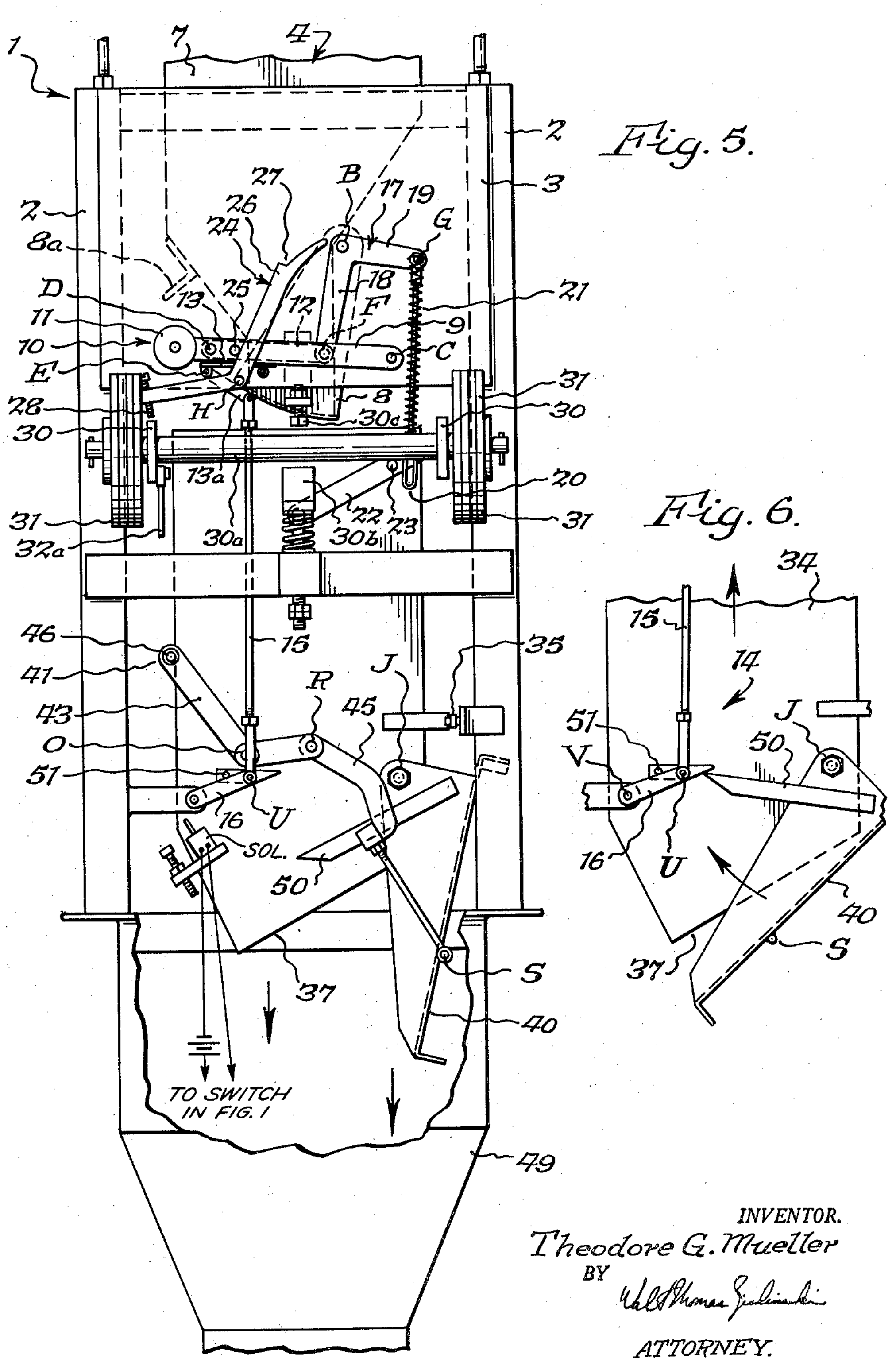
FIGURE 5 is a side view of the automatic weighing machine of FIGURE 1 in the door fastener released (dumping or unloading) position.
FIGURE 6 is a side section of the bucket lower end trap door of the automatic weighing machine of FIGURE 5 as it is returning to the fastened (loading) position.

As trap door 40 moves upwardly to a bucket 34 closing position, as in FIGURE 6, pawl actuating finger 50 again impinges against the end of pawl 16, this time from below. However, because outwardly projecting pin 51 on pawl 16 prevents any counter-clockwise rotation of the end past the rest of pawl 16, the entire pawl turns in a counter-clockwise direction about pivot point V and gate lock opener connecting rod 15 moves upwardly. This sets the rest of the mechanism to work; although it must be noted that, as in FIGURE 7, once bucket 34 has been emptied and the movement of weighing beam 30 favors counterpoise 31 by dropping its end of the beam downwardly, spring-biased weighing beam equilibrium aiding means 30*b* immediately begin to exert an upward force against dowel 30*a* of weighing beam 30, so as to counteract any weighing beam inertia or sluggishness and to minimize any sudden movements thereof. Of course, the effect of means 30*b* diminishes as material being fed into bucket 34 causes the movement of weighing beam 30 to favor it.

Figure 7:
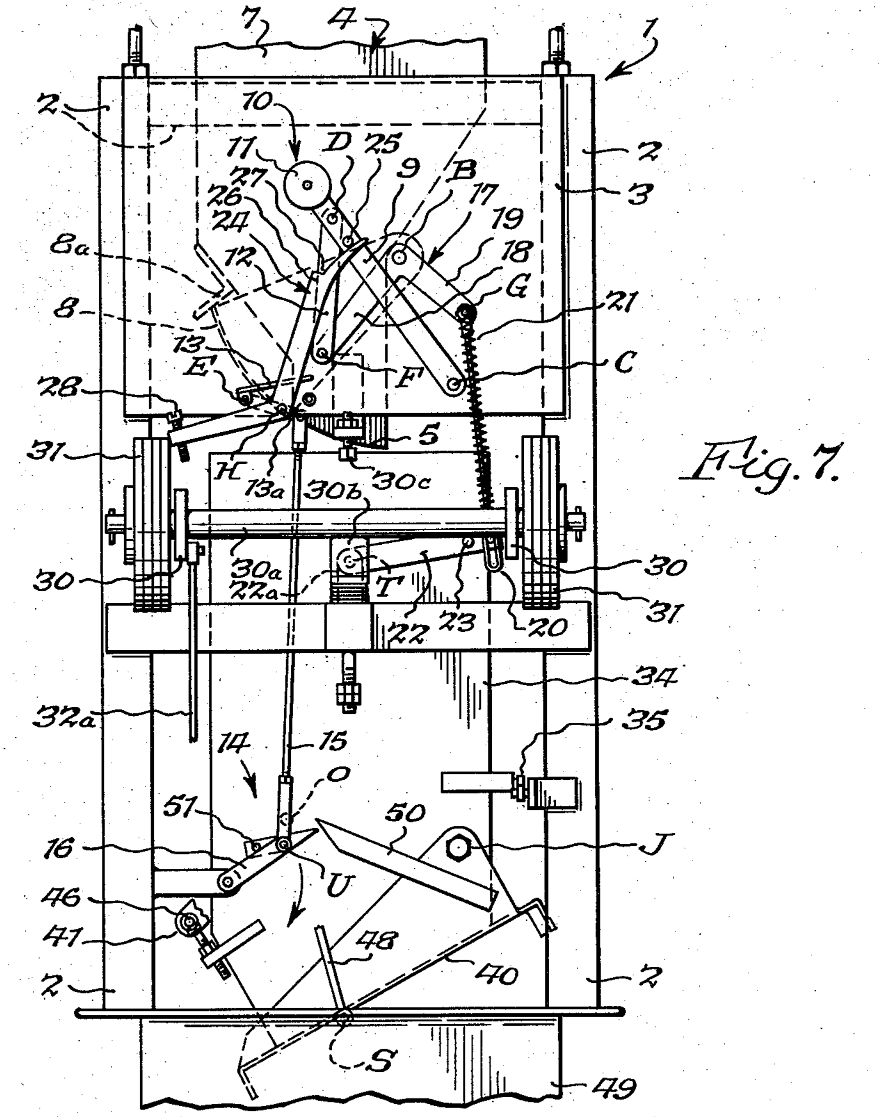
FIGURE 7 is a side view of the automatic weighing machine of FIGURE 1 in the lock opened (loading) position.

As shown further in FIGURE 7, the upward movement of connecting rod 15 causes gate lock opener lever 13 to impinge upwardly against gate lock toggle joint first leg 9 and to open lock 10. In other words, such movement causes first leg 9 to swing upwardly about pivot point C, second leg 12 to swing upwardly about pivot point F, and bell crank first arm 18 of gate lock closer 17 to swing upwardly with gate 8 about pivot point B, so that hopper 4 begins to feed bucket 34.

Figure 8:
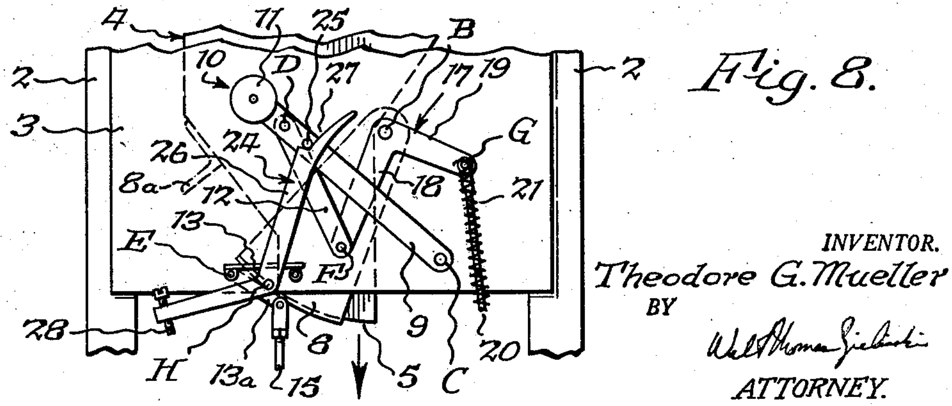
FIGURE 8 is a side section of the feed hopper gate of the automatic weighing machine of FIGURE 7 as it is returned to the locked (weighing) position.

As bucket 34 fills, the counterpoise end of weighing beam 30 rises and this movement is followed by sensing pin 23 impinging against the lower side of weighing beam dowel 30*a* and is communicated through slotted limit link 20 and tension spring 21 to bell crank second arm 19 of gate lock closer 17 which is thereby caused to rotate upwardly about pivot point B and to move gate 8 downwardly as it does so. However, as shown in FIGURE 8, this closing of gate 8 is at first partial, because gate lock 10 is arrested by virtue of the fact that stud 25 on lock toggle point first leg 9 is held in recess 27 on arresting bar 26 until the movement of the counterpoise end of weighing beam 30 upwardly causes it to impinge from below against adjustable screw 28 through bar 26 and causes the bar to rotate about pivot point H and to unseat stud 25, thereby allowing gate 8 and lock to quit their dribble position and to close.

What is claimed is:

1. An automatic weighing machine for powdered and particulate solid material comprising a framework; a material hopper having an open bottom and opposing sides and being mounted within the framework; a bottom gate suspended for rotation from the sides; a gate lock having a lock toggle joint and a lock weight and being suspended for rotation from the framework; the lock toggle joint having a first leg connected at one end to the lock weight and suspended at the other end for rotation from the framework and having a second leg suspended at one end for rotation from the first leg; a lock opener having a lever and a pawl and being suspended for rotation from the framework, the lever having one end adapted to impinge against the first leg from below and the other end connected to the pawl and being suspended for rotation from the framework, the pawl being mounted on the framework; a lock closer having a bell crank, a slotted limit link, a spring, and a sensing pin and being suspended for rotation with the gate from one side, the bell crank having a first arm suspended at one end for rotation from the other end of the second leg and suspended at the other end for rotation with the gate from the side and having a second arm suspended at one end for rotation with the gate from the side, the slotted limit link having one end suspended for rotation from the other end of the second arm, the spring having one end connected to the other end of the second arm, the sensing pin having one end suspended for rotation from the other ends of the slotted limit link and the spring; a fulcrum mounted on the framework; a weighing beam having one end adapted to impinge against the other end of the sensing pin from above and being suspended for rotation from the fulcrum; a counterpoise connected to the one end of the weighing beam; a knife-edge mounted on the other end of the weighing beam; a material weighing bucket having an open upper end positioned beneath the bottom, an open lower end, and opposing lateral surfaces and being suspended for rotation from the knife-edge; a lower end trap door having pawl actuating means and being suspended for rotation from the surfaces; a door fastener having fastener toggle joints and a fastener weight and being suspended for rotation from the surfaces, the fastener toggle joints having primary legs each connected at one end to the fastener weight and suspended for rotation from a surface and having secondary legs each suspended at one end for rotation from an other end of a primary leg and suspended at the other for rotation from the door; and, fastener releasing means responsive to weighing beam equilibrium.

2. An automatic weighing machine for powdered and particulate solid material comprising a framework; a maaterial hopper having an open bottom and opposing sides and being mounted within the framework; a bottom gate suspended for rotation from the sides; a gate lock having a lock toggle joint and a lock weight and being suspended for rotation from the framework, the lock toggle joint having a first leg connected at one end to the lock weight and suspended at the other end for rotation from the framework and having a second leg suspended at one end for rotation from the first leg; a lock opener having a lever and a pawl and being suspended for rotation from the framework, the lever having one end adapted to impinge against a leg from below and the other end connected to the pawl and being suspended for rotation from the framework, the pawl being mounted on the framework; a lock closer having a bell crank, a slotted limit link, a spring, and a sensing pin and being suspended for rotation with the gate from one side, the bell crank having a first arm suspended at one end for rotation from the other end of the second leg and suspended at the other end for rotation with the gate from the side and having a second arm suspended at one end for rotation with the gate from the side, the slotted limit link having one end suspended for rotation from the other end of the second arm, the spring having one end connected to the other end of the second arm, the sensing pin having one end suspended for rotation from the other ends of the slotted limit link and the spring; a closer arrester having a stud and a bar and being suspended for rotation from the side, the stud having one end mounted along the first leg inwardly of the lock weight and the one end of the second leg and the other end positioned outwardly of the first leg, the arresting bar having a recess along its upper edge at one end to receive the stud from above and being suspended for rotation from the framework; a fulcrum mounted on the framework; a weighing beam having one end adapted to impinge against the other end of the sensing pin from above and the other end of the arresting bar from below and being suspended for rotation from the fulcrum; weighing beam equilibrium aiding means; a counterpoise connected to the one end of the weighing beam; counterpoise compensating means; a knife-edge mounted on the other end of the weighing beam; a material weighing bucket having an open upper end positioned beneath the bottom, an open lower end, and opposing lateral surfaces and being suspended for rotation from the knife-edge; a lower end trap door having a pawl actuating means and being suspended for rotation from the surfaces; a door fastener toggle joints and a fastener weight and being suspended for rotation from the surfaces, the fastener toggle joints having primary legs each connected at one end to the fastener weight and suspended for rotation from a surface and having secondary legs each suspended at one end for rotation from an other end of a primary leg and suspended at the other for rotation from the door; and, fastener releasing means responsive to weighing beam equilibrium.

References Cited in the file of this patent

UNITED STATES PATENTS

| | | |
|---|---|---|
| 579,449 | Richards | Mar. 23, 1897 |
| 867,745 | McLeod | Oct. 8, 1907 |
| 1,173,732 | Parnall | Feb. 29, 1916 |
| 2,097,522 | Hanique | Nov. 2, 1937 |
| 2,939,494 | Haver | June 7, 1960 |

FOREIGN PATENTS

| | | |
|---|---|---|
| 409,629 | Great Britain | May 3, 1934 |